United States Patent [19]
Ogawa

[11] Patent Number: 6,117,961
[45] Date of Patent: *Sep. 12, 2000

[54] CROSSLINKABLE STYRENE BASED POLYMERS HAVING NARROW MOLECULAR WEIGHT DISTRIBUTION

[75] Inventor: Tetsuo Ogawa, Hiratsuka, Japan

[73] Assignee: Kansai Paint Co., Ltd., Hyogo-ken, Japan

[*] Notice: This patent is subject to a terminal disclaimer.

[21] Appl. No.: 08/846,096

[22] Filed: Apr. 25, 1997

[30] Foreign Application Priority Data

Apr. 25, 1996 [JP] Japan ..................................... 8-103086

[51] Int. Cl.$^7$ .............................. C08F 212/08; C08F 4/34

[52] U.S. Cl. .......................... 526/347; 526/184; 526/185; 526/189; 526/193; 526/196; 526/197; 526/204; 526/220; 526/260; 526/272; 526/279; 526/312; 526/318.42; 526/318.45; 526/320; 526/329.2

[58] Field of Search ..................................... 526/204, 347, 526/346, 227, 279, 312, 318.42, 318.45, 220, 260, 272, 320, 329.2, 184, 185, 189, 193, 196, 197

[56] References Cited

U.S. PATENT DOCUMENTS

| | | | |
|---|---|---|---|
| 4,581,429 | 4/1986 | Solomon et al. | ........................ 526/220 |
| 5,322,912 | 6/1994 | Georges et al. | . |
| 5,382,642 | 1/1995 | Guo | ..................................... 526/347 X |
| 5,401,804 | 3/1995 | Georges et al. | .................... 526/204 X |
| 5,610,249 | 3/1997 | Ogawa | ................ 526/204 X |
| 5,744,560 | 4/1998 | Foucher et al. | ..................... 526/204 X |

OTHER PUBLICATIONS

Gaynor et al, Controlled Radical Polymerization, J.M.S.–Pure Appl. Chem. A31(11), pp. 1561–1578 (1994).

*Primary Examiner*—Fred Teskin
*Attorney, Agent, or Firm*—Huntley & Associates

[57] ABSTRACT

The present invention provides a process for producing a crosslinkable styrene or styrene derivative polymer having narrow molecular weight distribution by radical polymerization of a styrene or styrene derivative monomer and other comonomer, wherein the polymerization is conducted in the presence of a catalyst system composed of a free radical compound and a radical polymerization initiator. With the present process, a heat- or photo-crosslinkable styrene or styrene derivative polymer having excellent rheology controlling ability and excellent reaction efficiency of a functional group can be obtained.

4 Claims, No Drawings

CROSSLINKABLE STYRENE BASED POLYMERS HAVING NARROW MOLECULAR WEIGHT DISTRIBUTION

BACKGROUND OF THE INVENTION

1. Field of the Invention

The present invention relates to a process for production of a crosslinkable styrene derivative polymer having narrow molecular weight distribution.

2. Description of the Prior Art

Various crosslinkable polymers are currently made by polymerization of a vinyl compound using a radical polymerization initiator. These polymers are used in various fields such as coatings or resists. In many cases, a crosslinkable functional group is introduced in these polymers to improve chemical or physical properties.

When a polymer contains a self-crosslinkable functional group which can be converted into a three-dimensional crosslinked resin by heating the polymer itself or by adding a curing catalyst to the polymer and heating the mixture; or when a polymer contains a crosslinkable functional group which can be converted into a three-dimensional crosslinked resin by using, in combination, a curing agent reactive with the crosslinkable functional group, the polymer is defined as a "heat-crosslinkable" resin, as well as a phenol resin, an epoxy resin or a melamine resin.

When a polymer contains a self-crosslinkable functional group which can be converted into a three-dimensional crosslinked resin by irradiating the polymer itself or by adding a curing catalyst to the polymer and exposing the mixture to actinic radiation (e.g. sunlight, an electronic beam or X-ray), or when a polymer contains a crosslinkable functional group which can be converted into a three-dimensional crosslinked resin by using, in combination, a curing agent reactive with the crosslinkable functional group and actinic radiation, the polymer is defined as a "photo-crosslinkable" resin.

The above-mentioned heat- or photo-crosslinkable styrene or styrene derivative polymers have previously been prepared by polymerization of a vinyl compound using a radical polymerization initiator. The polymers obtained by this process, however, generally have a broad molecular weight distribution and accordingly have limited applications because of the difficulty of rheology control. Furthermore, it is basically difficult to control the distribution of a crosslinkable functional group in a polymer molecule during polymerization, since the distribution of a crosslinkable functional group in a polymer molecule is determined according to the reactivity and composition of monomers during polymerization.

It would be highly desirable to obtain a polymer having a crosslinkable functional group, a narrow molecular weight distribution and a controlled functional group distribution, in order to solve the above-mentioned problems. It is also desirable to produce a polymer having a molecular weight distribution of smaller than 2 [the molecular weight distribution is generally expressed by the ratio (Mw/Mn) of weight-average molecular weight (Mw) and number-average molecular weight (Mn)]. Polymerization of a vinyl compound is also possible by using polymerization systems other than radical polymerization, i.e. an ionic polymerization or a coordination polymerization. However, in using ionic or coordination polymerization, a highly reactive polymerization initiator is typically used, and the presence of impurities (e.g. small amounts of water and active-hydrogen-containing compound) in the reaction system hinders the polymerization reaction and allows the produced polymer to have a broad molecular weight distribution.

U.S. Pat. No. 5,322,912 discloses a process for production of a thermoplastic resin having narrow molecular weight distribution. The polymer obtained by this process, however, does not contain a crosslinkable functional group and accordingly cannot be used as a crosslinkable resin.

SUMMARY OF THE INVENTION

The present invention provides a process for producing a heat- or photo-crosslinkable styrene or styrene derivative polymer having excellent rheology controlling ability and excellent reaction efficiency of a functional group. The resulting polymers exhibit a desirable combination of properties, including a narrow molecular weight distribution and a controlled functional group distribution.

Specifically, the present invention provides a process for producing a crosslinkable styrene based polymer having a narrow molecular weight distribution by radical polymerization of at least one styrene monomer and at least one comonomer, wherein the polymerization is conducted in the presence of a catalyst system composed of a free radical compound and a radical polymerization initiator.

The invention further provides polymers resulting from this process and coating compositions containing these polymers.

DETAILED DESCRIPTION OF THE INVENTION

The styrene or styrene derivative monomers which can be used in the present invention are collectively referred to as styrene monomers. Styrene monomers include, for example, styrene itself and o-, m- or p-substitution products thereof such as N,N-dimethylaminostyrene, aminostyrene, hydroxystyrene, methoxystyrene, methylatyrene, ethylstyrene, isopropylstyrene, t-butylstyrene, fluorostyrene, chlorostyrene, bromostyrene, iodostyrene, carboxystyrene, ethylcarboxystyrene, methylcarboxystyrene, trifluoromethylstyrene, cyanostyrene, nitrostyrene, chloromethylstyrene, glycidyloxystyrene, sodium styrenesulfonate, potassium styrenesulfonate and the like. These compounds can be used singly or as admixtures of two or more.

Comonomers which can be copolymerized with the styrene monomer, includes, for example, carboxyl group-containing unsaturated monomers such as (meth)acrylic acid, crotonic acid, itaconic acid, maleic acid, fumaric acid and the like; $C_{2-8}$ hydroxyalkyl esters of (meth)acrylic acid, such as 2-hydroxyethyl (meth)acrylate, 2-hydroxypropyl (meth)acrylate, 3-hydroxyethyl (meth)acrylate, hydroxybutyl (meth)acrylate and the like; monoesters between a polyether polyol (e.g. polyethylene glycol, polypropylene glycol or polybutylene glycol) and an unsaturated carboxylic acid [e.g. (meth)acrylic acid]; monoethers between a polyether polyol (e.g. polyethylene glycol, polypropylene glycol or polybutylene glycol) and a hydroxyl group-containing unsaturated monomer [e.g. 2-hydroxyethyl (meth)acrylate]; adducts between an alpha, beta-unsaturated carboxylic acid and a monoepoxy compound [e.g. Cardura E10 (a trade name of Shell Japan Ltd.) or an alpha-olefin epoxide]; adducts between glycidyl (meth)acrylate and a monobasic acid (e.g. acetic acid, propionic acid, p-t-butylbenzoic acid or a fatty acid); monoesters or diesters between an acid anhydride group-containing unsaturated compound (e.g. maleic anhydride or itaconic anhydride) and a glycol (e.g.

ethylene glycol, 1,6-hexanediol or neopentyl glycol); hydroxyalkyl vinyl ethers such as hydroxyethyl vinyl ether and the like; chlorine- and hydroxyl group-containing monomers such as 3-chloro-2-hydroxypropyl (meth)acrylate and the like; allyl alcohol; $C_{1-24}$ alkyl esters or cycloalkyl esters of (meth)acrylic acid, such as methyl (meth)acrylate, ethyl (meth)acrylate, propyl (meth)acrylate, isopropyl (meth) acrylate, n-, i- or t-butyl (meth)acrylate, hexyl (meth) acrylate, 2-ethylhexyl (meth)acrylate, n-octyl (meth) acrylate, decyl (meth)acrylate, stearyl (meth)acrylate, lauryl (meth)acrylate, cyclohexyl (meth)acrylate, isobornyl (meth) acrylate and the like; $C_{2-18}$ alkoxyalkyl esters of (meth) acrylic acid, such as methoxybutyl (meth)acrylate, ethoxybutyl (meth)acrylate and the like; chain alkyl vinyl ethers such as ethyl vinyl ether, n-propyl vinyl ether, isopropyl vinyl ether, butyl vinyl ether, t-butyl vinyl ether, pentyl vinyl ether, hexyl vinyl ether, octyl vinyl ether and the like; cycloalkyl vinyl ethers such as cyclopentyl vinyl ether, cyclohexyl vinyl ether and the like; aryl vinyl ethers such as phenyl vinyl ether, tolyl vinyl ether and the like; aralkyl vinyl ethers such as benzyl vinyl ether, phenetyl vinyl ether and the like; allyl ethers such as allyl glycidyl ether, allyl ethyl ether and the like; olefin or diene compounds such as ethylene, propylene, butylene, vinyl chloride, butadiene, isoprene, chloroprene and the like; hydrocarbon ring-containing unsaturated monomers such as alpha-methylstyrene, phenyl (meth)acrylate, phenylethyl (meth) acrylate, phenylpropyl (meth)acrylate, benzyl (meth) acrylate, phenoxyethyl (meth)acrylate, cyclohexyl (meth) acrylate, 2-acryloyloxyethyl hydrogenphthalate, 2-acryloyloxypropyl hydrogenphthalate, 2-acryloyloxypropyl hexahydrogenphthalate, 2-acryloyloxypropyl tetrahydrogenphthalate, an ester between p-t-butylbenzoic acid and hydroxyethyl (meth) acrylate, dicyclopentenyl (meth)acrylate and the like; nitrogen-containing alkyl (meth)acrylate such as N,N-dimethylaminoethyl (meth)acrylate, N,N-diethylaminoethyl (meth)acrylate, N-t-butylaminoethyl (meth)acrylate and the like; polymerizable amides such as (meth)acrylamide, N-methyl(meth)acrylamide, N-ethyl(meth)acrylamide, N,N-dimethyl(meth)acrylamide, N,N-dimethylaminopropyl(meth)acrylamide, N,N-dimethylaminopropyl(meth)acrylamide, N,N-dimethyldminoethyl(meth)acrylamide and the like; nitrogen-containing aromatic monomers such as 2-vinylpyridine, 1-vinyl-2-pyrrolidone, 4-vinylpyridine and the like; polymerizable nitriles such as acrylonitrile, methacrylonitrile and the like; nitrogen-containing unsaturated monomers such as allylamine and the like; glycidyl group-containing vinyl monomers such as glycidyl (meth)acrylate, allyl glycidyl ether, 3,4-epoxycyclohexylmethyl(meth) acrylate and the like; and alkoxysilyl group-containing vinyl monomers such as vinyltrimethoxysilane, vinyltriethoxysilane, vinyltripropoxysilane, gamma-methacryloxypropyltrimethoxysilane, gamma-methacryloxypropyltriethoxysilane, gamma-methacryloxypropyltripropoxysilane and the like. These compounds can be used singly or as admixture of two or more.

In the present invention, the above monomers can be used in a total amount of about from 5 to 2,000 moles, and preferably about from 10 to 1,000 moles per mole of the free radical compound described below.

The free radical compound used in the present process is a compound which can by itself be present as a stable free radical at room temperature and also under polymerization conditions and, during polymerization, can react with a propagating terminal radical of polymer to form a redissociable bond. Examples thereof include 2,2,6,6-tetramethyl-1-piperidinyloxy free radical (TEMPO), 4-hydroxy-2,2,6,6-tetramethyl-1-piperidinyloxy free radical (4-hydroxy TEMPO), 3-carbamoyl-2,2,5,5-tetramethylpyrrolidin-1-yloxy free radical, 3-carbamoyl-2,2,5,5-tetramethyl-3-pyrrolin-1- yloxy free radical, di-t-butyl nitroxide free radical, 2,6-di-t-butyl-alpha-(3,5-di-t-butyl-4-oxo-2,5-cyclohexadien-1-ylidene)-p-tolyloxy free radical (galvinoxyl free radical) and 2,2-di(4-t-octylphenyl)-1- picrylhydrazyl free radical (DPPH).

The radical polymerization initiator also used in the present process can vary widely, and can be selected from those ordinarily used in radical polymerization of a vinyl compound. Examples thereof include peroxides such as benzoyl peroxide, di-t-butyl hydroperoxide, t-butyl hydroperoxide, cumyl peroxide, cumene hydroperoxide, diisopropylbenzene hydroperoxide, t-butyl peroxybenzoate, lauryl peroxide, acetyl peroxide, t-butyl peroxy-2-ethylhexanoate and the like; and azo compounds such as alpha, alpha'-azobisisobutyronitrile, azobisdimethylvaleronitrile, azobiscyclohexanecarbonitrile and the like. These compounds can be used singly or as admixtures of two or more. The radical polymerization initiator can be used in an amount of generally about from 0.05 to 5 moles, preferably about from 0.1 to 3 moles, especially about from 0.2 to 2 moles per mole of the free radical compound.

In the polymerization conducted according to the present process, it is generally preferable that at first at least one styrene monomer, free radical compound, and radical polymerization initiator are mixed and the mixture is subjected to a preliminary reaction at about from 60 to 110° C. for about from 10 minutes to 6 hours. When this preliminary reaction is not conducted, the resulting styrene or styrene derivative polymer may have a broad molecular weight distribution or the molecular weight control of the polymer may be difficult. Then, polymerization can be conducted at a temperature of about from 110 to 150° C. with stirring. In the case of copolymerization, it is preferable that the second styrene monomers be added to conduct further polymerization. The polymerization of the present process is preferably conducted generally with an inert gas (e.g. nitrogen or argon) being blown into the reaction system. As necessary, an organic solvent may be used. Representative organic solvents include, for example, aromatic solvents such as xylene, toluene and the like; alcohol type solvents such as n-butanol, isopropyl alcohol and the like; ketone type solvents such as methyl ethyl ketone, methyl isobutyl ketone and the like; and ester type solvents such as ethyl acetate, butyl acetate, isobutyl acetate and the like.

When polymerization is conducted according to the present process, it is also preferable to add, in order to make the polymerization rate high, at least one compound selected from the group consisting of phosphorus compounds, aluminum compounds and boron compounds.

The phosphorus compounds include organic phosphorus compounds containing trivalent or pentavalent phosphorus. Examples thereof are phosphines such as trimethylphosphine, triethylphosphine, tri-n-propylphosphine, triisopropylphosphine, tri-n-butylphosphine, triisobutylphosphine, tri-sec-butylphosphine, tri-t-butylphosphine, triphenylphosphine, diphenylphosphine, dimethyl(phenyl)phosphine, methyldiphenylphosphine, tricyclohexylphosphine, dicyclohexylphosphine, tri-n-hexylphosphine, tri-n-octylphosphine, tri-o-tolylphosphine, tri-m-tolylphosphine, tri-p-tolylphosphine, dicyclo(ethyl)phosphine, dicyclo (phenyl)phosphine, chlorodiphenylphosphine, tetraphenyldiphosphine, bis(diphenylphosphino)methane, 1,2-bis(diphenylphosphino)ethane, 1,3-bis (diphenylphosphino)propane, 1,4-bis(diphenylphosphino) butane and the like; phosphine oxide such as tri-n-butylphosphine oxide, triphenylphosphine oxide, tri-n-octylphosphine oxide and the like; phosphorus acid esters such as trimethyl phosphate, dimethyl phosphate, triethyl phosphate, diethyl phosphate, triisopropyl phosphate, tri-n-butyl phosphate, triphenyl phosphate, diphenyl isodecyl phosphate, phenyl diisooctyl phosphate, triisooctyl phosphate, di(nonylphenyl)dinonylphenyl phosphate, tris (nonylphenyl) phosphate, tris(2,4-di-t-butylphenyl) phosphate, cyclic neopentane tetrayl bis(2,4-di-t-butylphenyl) phosphate, 2,2-methylene bis(4,6-di-t-butylphenyloctyl) phosphate, 4,41-butylidene bis(3-methyl-6-t-butylphenyl-di-tridecyl) phosphate, distearyl pentaerythritol diphosphite, diisodecyl pentaerythritol diphosphite and the like; phosphorus amides such as hexamethylphosphorus triamide, hexaethylphosphorus triamide and the like; phosphoric acid esters such as trimethyl phosphate, triethyl phosphate, tri-n-butyl phosphate, triphenyl phosphate and the like. The phosphorus compound is preferably an organic phosphorus compound containing trivalent phosphorus such as phosphine, phosphorus acid aster or phosphorus amide, more preferably a phosphorus acid ester. There can also be preferably used an organic phosphorus compound containing pentavalent phosphorus, such as phosphine oxide, phosphoric acid ester or phosphoric triamide. Most preferable as the phosphorus compound is a phosphorus acid ester.

Aluminum compounds which can be used in the present invention include, for example, aluminum trimethoxide, aluminum triethoxide, aluminum triisopropoxide, aluminum tri-n-butoxide, aluminum tri-sec-butoxide, aluminum tri-t-butoxide and the like.

Boron compounds which can be used in the present invention include, for example, trimethoxyborane, triethoxyborane, triisopropoxyborane, triphenoxyborane and the like.

The phosphorus, aluminum or boron compounds mentioned above can be used in an amount of generally about from 0.1 to 20 moles, and preferably about from 0.3 to 10 moles, per mole of the free radical compound.

The phosphorus, aluminum or boron compounds mentioned above may be added at the time when polymerization is conducted at 110 to 150° C. after a mixture of a styrene or styrene derivative monomer, a free radical compound and a radical polymerization initiator have been subjected to a preliminary reaction at 60 to 110° C. for 10 minutes to 6 hours.

According to the polymerization process of the present invention, there can be obtained a crosslinkable styrene based polymer having narrow molecular weight distribution which generally has a Mw/Mn ratio of smaller than about 2, preferably about 1.6 or less and which is preferably monodisperse.

The styrene based polymers of the present invention are also preferably characterized by a number-average molecular weight of about from 500 to 200,000, especially about from 500 to 100,000.

Also according to the present invention, there can be easily obtained a crosslinkable styrene based polymer substantially free from unreacted monomer by stopping the polymerization reaction during polymerization and purifying the reaction mixture.

The crosslinkable styrene based polymer obtained by the present process, when containing a self-crosslinkable functional group (e.g. an alkoxysilyl group, a glycidyl group or an N-methylol group), can be converted into a three-dimensional crosslinked resin by heating the polymer itself or by adding a curing catalyst to the polymer and, as necessary, heating the mixture.

The crosslinkable styrene or styrene derivative polymer obtained by the present process, when containing a crosslinkable functional group (e.g. an hydroxyl group, a carboxyl group, a glycidyl group, an alkoxysilyl group or an N-methylol group), can be converted into a three-dimensional crosslinked resin by using, in combination, a curing agent reactive with the crosslinkable functional group.

It is also possible to introduce the above-mentioned self-crosslinkable functional group into the crosslinkable styrene based polymer obtained by the present process.

The crosslinkable styrene based polymer obtained by the present process can be used as a molding material or film material, or in coatings, resists, and other similar applications.

When a crosslinkable polymer obtained by the present process is applied to a solvent-based thermosetting composition, it is possible to obtain a coating composition having excellent pigment-dispersing ability and excellent efficiency of crosslinking reaction. In contrast, only a coating composition having poor pigment-dispersing ability and poor efficiency of crosslinking reaction can be obtained by using a conventional crosslinkable polymer obtained by the per-se known radical polymerization method because of its broad molecular weight distribution and its non-controlled distribution of a crosslinkable functional group.

When a crosslinkable polymer obtained by the present process is applied to a powder coating composition, it is possible to obtain a coating composition having excellent storage stability and a coating film having excellent strength, and accordingly reduce the drawbacks of the compositions of the prior art wherein a conventional crosslinkable polymer is used which is obtained by the per-se known radical polymerization methods.

When a crosslinkable polymer obtained by the present process is applied to a photoresist coating composition, it is possible to obtain a photoresist coating film having high resolving power because of its narrow molecular weight distribution and its controlled distribution of a crosslinkable and/or developable functional group.

Examples of crosslinkable styrene based polymers which can be used as photoresists that can be developed by using an alkaline solution, water or an acidic solution are as follows:

(a) A styrene based polymer according to the present process wherein the polymer has, in a molecule, a polymerizable unsaturated group and a carboxylic group which is an addition reaction product between a copolymer of styrene, (meth)acrylic acid and other comonomer, and a compound having both an epoxy group and a polymerizable unsaturated group.

(b) A styrene based polymer according to the present process wherein the polymer has, in a molecule, a polymerizable unsaturated group and a carboxylic group which is an addition reaction product between a copolymer of styrene, itaconic or maleic anhydride and other comonomer, and a compound having both a hyrdoxyl group and a polymerizable unsaturated group.

(c) A styrene based polymer according to the present process wherein the polymer has, in a molecule, an onium salt group and a polymerizable unsaturated group which is obtained by the reaction of a copolymer of styrene, a monomer having an epoxy group and other comonomer, a compound capable of forming an onium salt such as tert-amine, sec-thioether or tert-phosphine, an organic acid and (meth)acrylic acid.

(d) As a resin which can be used as a positive-type resist, a styrene based polymer according to the present process wherein the polymer is an addition reaction product between a copolymer of styrene, (meth)acrylic acid, a monomer having a hydroxyl group and other comonomer, and an adduct of a compound having quinone diazide group such as 1,2-naphthoquinone-diazide-5-[N-methyl-N-(2-hydroxyethyl)]sulfonate and a diisocyanate compound, or a resin composition comprising a copolymer of styrene, (meth)acrylic acid and other comonomer according to the present process, and a quinone diazide compound.

The above crosslinkable styrene based polymers (a) to (c) can be used in combination with a photopolymerization initiator, a photosensitizer or a basic compound such as amine compounds, and other additives such as coloring pigments, extender pigments, rust proofing pigments and dyes.

The above-mentioned resins for resists can be applied onto a substrate having a conductive surface (e.g. copper foil, copper alloy foil or stainless steel foil) as a liquid resist dissolved in an organic solvent or dispersed or dissolved in water, as a electrodeposition resist dispersed or dissolved in water, or as a dry film-type resist.

The resist comprising a crosslinkable styrene or styrene derivative polymer obtained by the present process can be used in an exposure method using a pattern mask or a direct drawing method using a laser beam, or to a resist by using an electronic beam or an X-ray.

EXAMPLES

The present invention is hereinafter described more specifically by way of Examples. In the following, "part(s)" and "%" refer to "part(s) by weight" and "% by weight," respectively. All the raw materials used in Examples and Comparative Examples were commercial products.

| Example 1 | |
|---|---|
| TEMPO | 15.6 parts |
| t-Butyl peroxy-2-ethylhexanoate | 13.0 parts |
| Styrene | 1,040 parts |

A mixture consisting of the above components was stirred at 95° C. for 4 hours while blowing nitrogen gas thereinto. Thereto was added 640 parts of n-butyl acrylate, followed by stirring 125° C. for 12 hours. Then, thereto were added 180 parts of acrylic acid and 809 parts of m-xylene, followed by stirring at 125° C. for 20 hours. The conversion of the resin solution obtained, which was determined as a ratio of a non-volatile material after taking 2 g of the res solution and 0.01 g of benzoquinone in a tin dish and drying at 80° C. for 3 hours under a reduced pressure, was 98%. The polymer formed was found, as measured by GPC (gel permeation chromatography), to be a monodisperse resin having a number-average molecular weight (Mn) of 20,700 and a molecular weight distribution (Mw/Mn) of 1.38. The above resi solution was diluted to a solid content of 55% by m-xylene to obtain resin solution (A).

| Example 2 | |
|---|---|
| TEMPO | 15.6 parts |
| t-Butyl peroxy-2-ethylhexanoate | 13.0 parts |
| Styrene | 1,040 parts |

A mixture consisting of the above components was stirred at 95° C. for 4 hours while blowing nitrogen gas thereinto. Thereto were added 512 parts of n-butyl acrylate and 497 parts of glycidyl methacrylate, followed by stirring at 125° C. for 25 hours. The conversion of the resin solution obtained, which was determined as a ratio of a non-volatile material after taking 2 g of the resin solution and 0.01 g of benzoquinone in a tin dish and drying at 80° C. for 3 hours under a reduced pressure, was 80%. The resin solution was poured into about twenty times the quantity of methanol to precipitate the resin produced, followed by filtrating and drying under a reduced pressure, to obtain a solid resin. The polymer formed was found, as measured by GPC (gel permeation chromatography), to be a monodisperse resin having a number-average molecular weight (Mn) of 18,500 and a molecular weight distribution (Mw/Mn) of 1.31. The above solid resin was dissolved in m-xylene to a solid content of 55% to obtain resin solution (B).

| Example 3 | |
|---|---|
| TEMPO | 15.6 parts |
| t-Butyl peroxy-2-ethylhexanoate | 13.0 parts |
| Styrene | 1,040 parts |

A mixture consisting of the above components was stirred at 95° C. for 4 hours while blowing nitrogen gas thereinto. Thereto were added 128 parts of n-butyl acrylate and 348 parts of 2-hydroxyethyl acrylate, followed by stirring at 125° C. for 12 hours. Furthermore, thereto was added 5 parts of N,N-dimethylaminoethyl acrylate, followed by stirring at 125° C. for 15 hours and cooling. The conversion of the resin solution obtained, which was determined as a ratio of a non-volatile material after taking 2 g of the resin solution and 0.01 g of benzoquinone in a tin dish and drying at 80° C. for 3 hours under a reduced pressure, was 85%. The resin solution was poured into about twenty times the quantity of hexane to precipitate the resin produced, followed by filtrating and drying under a reduced pressure, to obtain a solid resin. The polymer formed was found, as measured by GPC (gel permeation chromatography), to be a monodisperse resin having a number-average molecular weight (Mn) of 15,600 and a molecular weight distribution (Mw/Mn) of 1.35. The above solid resin was dissolved in m-xylene to a solid content of 55% to obtain resin solution (C).

| Example 4 | |
|---|---|
| TEMPO | 15.6 parts |
| t-Butyl peroxy-2-ethylhexanoate | 13.0 parts |
| Styrene | 1,040 parts |

A mixture consisting of the above components was stirred at 95° C. for 4 hours while blowing nitrogen gas thereinto. Thereto were added 128 parts of n-butyl acrylate and 348 parts of 2-hydroxyethyl acrylate, followed by stirring at 125° C. for 12 hours. Furthermore, thereto were added 5 parts of N,N-dimethylaminoethyl acrylate, 652 parts of m-xylene and 30 parts of triphenyl phosphate, followed by stirring at 125° C. for 10 hours and cooling. The conversion of the resin solution obtained, which was determined as a ratio of a non-volatile material after taking 2 g of the resin solution and 0.01 g of benzoquinone in a tin dish and drying at 80° C. for 3 hours under a reduced pressure, was 98%. The polymer formed was found, as measured by GPC (gel permeation chromatography), to be a monodisperse resin having a number-average molecular weight (Mn) of 17,900 and a molecular weight distribution (Mw/Mn) of 1.32. The above resin solution was dissolved in m-xylene to a solid content of 55% to obtain resin solution (D).

| Comparative Example 1 | |
| --- | --- |
| t-Butyl peroxy-2-ethylhexanoate | 37 parts |
| Styrene | 1,040 parts |
| n-Butyl acrylate | 640 parts |
| Acrylic acid | 180 parts |

A flask was charged with 1,265 parts of m-xylene followed by replacing the inner space with nitrogen gas and then heating to a temperature of 115° C. with agitation. Then, a mixture consisting of the above components was added dropwise over 4 hours while blowing nitrogen gas thereinto. Thereinto was added 9 parts of t-butyl peroxy-2-ethylhexanoate followed by stirring at 115° C. for 2 hours and cooling. The conversion of the resin solution obtained, which was determined as a ratio of a non-volatile material after taking 2 g of the resin solution and 0.01 g of benzoquinone in a tin dish and drying at 80° C. for 3 hours under a reduced pressure, was 98%. The polymer formed was found, as measured by GPC (gel permeation chromatography), to be a resin having a number-average molecular weight (Mn) of 18,500 and a molecular weight distribution (Mw/Mn) of 2.56. The above resin solution was diluted with m-xylene to a solid content of 55% to obtain resin solution (E).

| Comparative Example 2 | |
| --- | --- |
| t-Butyl peroxy-2-ethylhexanoate | 37 parts |
| Styrene | 1,040 parts |
| n-Butyl acrylate | 512 parts |
| Glycidyl methacrylate | 497 parts |

A flask was charged with 1,077 parts of m-xylene followed by replacing the inner space with nitrogen gas and then heating to a temperature of 115° C. with agitation. Then, a mixture consisting of the above components was added dropwise over 4 hours while blowing nitrogen gas thereinto. Thereinto was added 8 parts of t-butyl peroxy-2-ethylhexanoate followed by stirring at 115° C. for 2 hours and cooling. The conversion of the resin solution obtained, which was determined as a ratio of a non-volatile material after taking 2 g of the resin solution and 0.01 g of benzoquinone in a tin dish and drying at 80° C. for 3 hours under a reduced pressure, was 98%. The polymer formed was found, as measured by GPC (gel permeation chromatography), to be a resin having a number-average molecular weight (Mn) of 17,300 and a molecular weight distribution (Mw/Mn) of 2.82. The above resin solution was diluted with m-xylene to a solid content of 55% to obtain resin solution (F).

| Comparative Example 3 | |
| --- | --- |
| t-Butyl peroxy-2-ethylhexanoate | 32 parts |
| Styrene | 1,040 parts |
| n-Butyl acrylate | 128 parts |
| 2-Hydroxyethyl acrylate | 348 parts |
| N,N-Dimethylaminoethyl acrylate | 72 parts |

A flask was charged with 1,077 parts of m-xylene followed by replacing the inner space with nitrogen gas and then heating to a temperature of 115° C. with agitation. Then, a mixture consisting of the above components was added dropwise over 4 hours while blowing nitrogen gas thereinto. Thereinto was added 8 parts of t-butyl peroxy-2-ethylhexanoate followed by stirring at 115° C. for 2 hours and cooling. The conversion of the resin solution obtained, which was determined as a ratio of a non-volatile material after taking 2 g of the resin solution and 0.01 g of benzoquinone in a tin dish and drying at 80° C. for 3 hours under a reduced pressure, was 98%. The polymer formed was found, as measured by GPC (gel permeation chromatography), to be a resin having a number-average molecular weight (Mn) of 15,900 and a molecular weight distribution (Mw/Mn) of 2.77. The above resin solution was diluted with m-xylene to a solid content of 55% to obtain a resin solution (G).

| Comparative Example 4 | |
| --- | --- |
| TEMPO | 15.6 parts |
| t-Butyl peroxy-2-ethylhexanoate | 13.0 parts |
| Styrene | 1,040 parts |

A mixture consisting of the above components was stirred at 95° C. for 4 hours while blowing nitrogen gas thereinto. Thereto was added 512 parts of n-butyl acrylate, followed by stirring at 125° C. for 12 hours. Furthermore, thereto was added 5 parts of N,N-dimethylaminoethyl acrylate, followed by stirring at 125° C. for 15 hours and cooling. The conversion of the resin solution obtained, which was determined as a ratio of a non-volatile material after taking 2 g of the resin solution and 0.01 g of benzoquinone in a tin dish and drying at 80° C. for 3 hours under a reduced pressure, was 80%. The resin solution was poured into about twenty times the quantity of methanol to precipitate the resin produced, followed by filtrating and drying under a reduced pressure, to obtain a solid resin. The polymer formed was found, as measured by GPC (gel permeation chromatography), to be a resin having a number-average molecular weight (Mn) of 14,800 and a molecular weight distribution (Mw/Mn) of 1.32. The above solid resin was dissolved in m-xylene to a solid content of 55% to obtain resin solution (H).

Application Examples 1 to 5 and Comparative Application Examples 1 to 4 (Application to Solvent-Based Thermosetting Coatings)

The resin solutions (A) to (H) obtained by Examples 1 to 4 and Comparative Examples 1 to 4 were compounded in the proportions (expressed in terms of solid content) shown in Table 1 by a per-se known method to obtain solvent-based thermosetting coating compositions.

The symbols in Table I have the following meaning:

ESCN-195: cresol-novolak epoxy resin, a product of SUMITOMO CHEMICAL CO., LTD.

Ms-11: melamine curing agent, a product of SANWA CHEMICAL CO., LTD.

TEABr: tetraethylammonium bromide

PTS: p-toluenesulfonic acid

The thus obtained solvent-based coating compositions were coated on a galvanized sheet iron by use of a bar-coater so as to give a film (as cured) of 20 micrometer followed by drying for 20 minutes at room temperature and baking for 30 minutes at a temperature of 140° C. to obtain a test panel.

The thus obtained test panels were tested for properties as follows.

20 Degree gloss of cured film: 20 Degree specular reflection value was measured.

Solvent resistance of cured film: 20 Degree specular reflection was measured after rubbing a film surface 50 times using an absorbent cotton containing acetone.

Acid resistance of cured film: The test panel was immersed in a 1% solution of sulfuric acid for 2 hours at a temperature of 35° C. The film appearance was evaluated according to the following criteria:

A: No change.

B: Blistering was observed.

C: Flaking was observed.

Storage stability of composition: The coating compositions were diluted with "SWASOL 1000" (trademark, a product of Cosmo Oil Co., Ltd., hydrocarbon solvent) to a solid content of 20% and placed into a cylindrical vessel, 6 centimeters tall, with a bottom area of about 20 square centimeters, followed by storing at a temperature of 30° C. for 7 days. The storage stability was indicated by letters A or B, where:

A: No change.

B: Caking was observed.

The results are shown in Table 1.

| Example 5 | |
| --- | --- |
| TEMPO | 15.6 parts |
| t-Butyl peroxy-2-ethylhexanoate | 13.0 parts |
| Styrene | 312 parts |

A mixture consisting of the above components was stirred at 95° C. for 4 hours while blowing nitrogen gas thereinto. Thereto were added 64 parts of n-butyl acrylate and 213 parts of glycidyl methacrylate, followed by stirring at 125° C. for 20 hours. The conversion of the resin solution obtained, which was determined as a ratio of a non-volatile material after taking 2 g of the resin solution and 0.01 g of benzoquinone in a tin dish and drying at 80° C. for 3 hours under a reduced pressure, was 60%. The resin solution was poured into about twenty times the quantity of methanol to precipitate the resin produced, followed by filtrating and drying under a reduced pressure, to obtain a solid resin (I). The polymer formed was found, as measured by GPC (gel permeation chromatography), to be a monodisperse resin having a number-average molecular weight (Mn) of 3,700, a molecular weight distribution (Mw/Mn) of 1.3 and an epoxy equivalent of 400.

| Example 6 | |
| --- | --- |
| TEMPO | 15.6 parts |
| t-Butyl peroxy-2-ethylhexanoate | 13.0 parts |
| Styrene | 312 parts |

A mixture consisting of the above components was stirred at 95° C. for 4 hours while blowing nitrogen gas thereinto. Thereto were added 64 parts of n-butyl acrylate and 234 parts of 2-methylglycidyl methacylate, followed by stirring at 125° C. for 20 hours. The conversion of the resin solution obtained, which was determined as a ratio of a non-volatile material after taking 2 g of the resin solution and 0.01 g of benzoquinone in a tin dish and drying at 80° C. for 3 hours under a reduced pressure, was 63%. The resin solution was poured into about twenty times the quantity of methanol to precipitate the resin produced, followed by filtrating and drying under a reduced pressure, to obtain a solid resin (J). The polymer formed was found, as measured by GPC (gel permeation chromatography), to be a monodisperse resin having a number-average molecular weight (Mn) of 4,000 and a molecular weight distribution Mw/Mn) of 1.3.

| Example 7 | |
| --- | --- |
| TEMPO | 15.6 parts |
| t-Butyl peroxy-2-ethylhexanoate | 13.0 parts |
| Styrene | 312 parts |

A mixture consisting of the above components was stirred at 95° C. for 4 hours while blowing nitrogen gas thereinto. Thereto were added 256 parts of n-butyl acrylate and 116 parts of 2-hydroxyethyl acrylate, followed by stirring at 125° C. for 20 hours. The conversion of the resin solution obtained, which was determined as a ratio of a non-volatile material after taking 2 g of the resin solution and 0.01 g of benzoquinone in a tin dish and drying at 80° C. for 3 hours under a reduced pressure, was 58%. The resin solution was poured into about twenty times the quantity of methanol to precipitate the resin produced, followed by filtrating and drying under a reduced pressure, to obtain a solid resin (K). The polymer formed was found, as measured by GPC (gel permeation chromatography), to be a monodisperse resin having a number-average molecular weigh (Mn) of 4,200 and a molecular weight-distribution (Mw/Mn) of 1.4.

| Example 8 | |
| --- | --- |
| TEMPO | 15.6 parts |
| t-Butyl peroxy-2-ethylhexanoate | 13.0 parts |
| Styrene | 312 parts |

A mixture consisting of the above components was stirred at 95° C. for 4 hours while blowing nitrogen gas thereinto. Thereto were added 166 parts of n-butyl acrylate and 50 parts of acrylic acid, followed by stirring at 125° C. for 4 hours. The conversion of the resin solution obtained, which was determined as a ratio of a non-volatile material after taking 2 g of the resin solution and 0.01 g of benzoquinone in a tin dish and drying at 80° C. for 3 hours under a reduced pressure, was 69%. The resin solution was poured into about twenty times the quantity of methanol to precipitate the resin produced, followed by filtrating and drying under a reduced pressure, to obtain a solid resin (L). The polymer formed was found, as measured by GPC (gel permeation chromatography), to be a monodisperse resin having a number-average molecular weight (Mn) of 4,300 and a molecular weight distribution (Mw/Mn) of 1.3.

| Comparative Example 5 | |
| --- | --- |
| t-Butyl peroxy-2-ethylhexanoate | 30 parts |
| Styrene | 312 parts |
| n-Butyl acrylate | 64 parts |
| Glycidyl methacrylate | 213 parts |

A flask was charged with 452 parts of xylene followed by replacing the inner space with nitrogen gas and then heating to a temperature of 110° C. with agitation. Then, a mixture consisting of the above components was added dropwise over 3 hours while blowing nitrogen gas thereinto. Thereinto were added 3 parts of t-butyl peroxy-2-ethylhexanoate followed by stirring at 110° C. for 2 hours and cooling. The conversion of the resin solution obtained, which was determined as a ratio of a non-volatile material after taking 2 g of the resin solution and 0.01 g of benzoquinone in a tin dish and drying at 80° C. for 3 hours under a reduced pressure, was 99%. The resin solution was poured into about twenty times the quantity of methanol to precipitate the resin produced, followed by filtrating and drying under a reduced pressure, to obtain a solid resin (M). The polymer formed was found, as measured by GPC (gel permeation chromatography), to be a resin having a number-average molecular-weight (Mn) of 5,500 and a molecular weight distribution (Mw/Mn) of 2.3.

| Comparative Example 6 | |
| --- | --- |
| t-Butyl peroxy-2-ethylhexanoate | 47 parts |
| Styrene | 312 parts |
| n-Butyl acrylate | 64 parts |
| Glycidyl methacrylate | 213 parts |

A flask was charged with 435 parts of xylene followed by replacing the inner space with nitrogen gas and then heating to a temperature of 110° C. with agitation. Then, a mixture consisting of the above components was added dropwise over 3 hours while blowing nitrogen gas thereinto. Thereinto were added 3 parts of t-butyl peroxy-2-ethylhexanoate followed by stirring at 110° C. for 2 hours and cooling. The conversion of the resin solution obtained, which was determined as a ratio of a non-volatile material after taking 2 g of the resin solution and 0.01 g of benzoquinone in a tin dish and drying at 80° C. for 3 hours under a reduced pressure, was 99%. The resin solution was poured into about twenty times the quantity of methanol to precipitate the resin produced, followed by filtrating and drying under a reduced pressure, to obtain a solid resin (N). The polymer formed was found, as measured by GPC (gel permeation chromatography), to be a resin having a number-average molecular weight (Mn) of 3,300 and a molecular weight distribution (Mw/Mn) of 2.5.

| Comparative Example 7 | |
| --- | --- |
| t-Butyl peroxy-2-ethylhexanoate | 30 parts |
| Styrene | 312 parts |
| n-Butyl acrylate | 64 parts |
| 2-Methylglycidyl methacrylate | 234 parts |

A flask was charged with 469 parts of xylene followed by replacing the inner space with nitrogen gas and then heating to a temperature of 110° C. with agitation. Then, a mixture consisting of the above components was added dropwise over 3 hours while blowing nitrogen gas thereinto. Thereinto was added 3 parts of t-butyl peroxy-2-ethylhexanoate followed by stirring at 110° C. for 2 hours and cooling. The conversion of the resin solution obtained, which was determined as a ratio of a non-volatile material after taking 2 g of the resin solution and 0.01 g of benzoquinone in a tin dish and drying at 80° C. for 3 hours under a reduced pressure, was 99%. The resin solution was poured into about twenty times the quantity of methanol to precipitate the resin produced, followed by filtrating and drying under a reduced pressure, to obtain a solid resin (O). The polymer formed was found, as measured by GPC (gel permeation chromatography), to be a resin having a number-average molecular weight (Mn) of 5,900 and a molecular weight distribution (Mw/Mn) of 2.5.

| Comparative Example 8 | |
| --- | --- |
| t-Butyl peroxy-2-ethylhexanoate | 34 parts |
| Styrene | 312 parts |
| n-Butyl acrylate | 256 parts |
| 2-Hydroxyethyl acrylate | 234 parts |

A flask was charged with 526 parts of xylene followed by replacing the inner space with nitrogen gas and then heating to a temperature of 110° C. with agitation. Then, a mixture consisting of the above components was added dropwise over 3 hours while blowing nitrogen gas thereinto. Thereinto was added 3 parts of t-butyl peroxy-2-ethylhexanoate followed by stirring at 110° C. for 2 hours and cooling. The conversion of the resin solution obtained, which was determined as a ratio of a non-volatile material after taking 2 g of the resin solution and 0.01 g of benzoquinone in a tin dish and drying at 80° C. for 3 hours under a reduced pressure, was 99%. The resin solution was poured into about twenty times the quantity of methanol to precipitate the resin produced, followed by filtrating and drying under a reduced pressure, to obtain a solid resin (P). The polymer formed was found, as measured by GPC (gel permeation chromatography), to be a resin having a number-average molecular weight (Mn) of 6,100 and a molecular weight distribution (Mw/Mn) of 2.3.

| Comparative Example 9 | |
| --- | --- |
| t-Butyl peroxy-2-ethylhexanoate | 26 parts |
| Styrene | 312 parts |
| n-Butyl acrylate | 166 parts |
| Acrylic acid | 50 parts |

A flask was charged with 406 parts of xylene followed by replacing the inner space with nitrogen gas and then heating to a temperature of 110° C. with agitation. Then, a mixture consisting of the above components was added dropwise over 3 hours while blowing nitrogen gas thereinto. Thereinto was added 3 parts of t-butyl peroxy-2-ethylhexanoate followed by stirring at 110° C. for 2 hours and cooling. The conversion of the resin solution obtained, which was determined as a ratio of a non-volatile material after taking 2 g of the resin solution and 0.01 g of benzoquinone in a tin dish and drying at 80° C. for 3 hours under a reduced pressure, was 99%. The resin solution was poured into about, twenty times the quantity of n-hexane to precipitate the resin produced, followed by filtrating and drying under a reduced pressure, to obtain a solid resin (Q). The polymer formed was found, as measured by GPC (gel permeation chromatography, to be a resin having a number-average molecular weight (Mn) of 5,300 and a molecular weight distribution (Mw/Mn) of 2.2.

Application Examples 6 to 9 and Comparative Application Examples 5 to 9 (Application to Thermosetting Powder Coatings)

Individual solid resins (I) to (Q) obtained by Examples 5 to 9 and Comparative Examples 5 to 9 and other components were respectively mixed in a dry blender at room temperature and then heated in an extruder to melt blend the components. The samples upon cooling were reduced to fine powder by a pin disc mill, filtered through a strainer of 150 mesh to yield the respective compositions.

Table 2 lists the amount of the respective components in the different examples. The symbols in Table 2 have the following meaning:

B1530: epsilon-caprolactam blocked isophoione diisocyanate isocyanurate, a product of HULS CO., having a trade name of "VESTAGON B 1530."

TGIC: triglycidyl isocyanurate.

POLYFLOW-S: surface conditioning agent, a product of KYOEISHA CHEMICAl CO., LTD. having a tradename of "POLYFLOW-S."

On a mild steel sheet treated with zinc phosphate was formed a cationic electrodeposition coating film (film thickness: 20 micrometers when cured) and an intercoat coating film (film thickness: 20 micrometers when cured) followed by wet sanding by #400 sand paper and drying. MAGICRON BASECOAT HM-22 (tradename, a metallic basecoat composition of KANSAI PAINT CO.) was applied thereon (film thickness: 15 micrometers when cured) and heated to about 140° C. for 30 minutes in an electric oven. Then, each of the foregoing powder coating compositions was applied thereon (film thickness: 70 micrometers when cured) and heated to about 160° C. for 30 minutes. Table 2 shows the results obtained by the performance tests of the films together with other results as explained below:

Caking of composition: The coating composition was placed into a cylindrical vessel, 6 centimeters tall, with a bottom area of about 20 square centimeters, and stored at 30° C. for 7 days. The degree of caking is indicated by letters A, B or C, where:
A: No caking.
B: Caking the size of grains of rice.
C: Whole caking.

Finish appearance of cured film: Evaluated with an unaided eye from the viewpoint of gloss and smoothness according to the following criteria:
A: Excellent.
B: Good.
C: No good.

60 Degree gloss of cured film: 60 Degree specular reflection value was measured.

| Example 9 | |
|---|---|
| TEMPO | 15.6 parts |
| t-Butyl peroxy-2-ethylhexanoate | 13.0 parts |
| Styrene | 416 parts |

A mixture consisting of the above components was stirred at 95° C. for 4 hours while blowing nitrogen gas thereinto. Thereto were added 58 parts of 2-hydroxyethyl acrylate and 180 parts of acrylic acid, followed by stirring at 125° C. for 5 hours. Thereto was added 293 parts of m-xylene followed by stirring at 125° C. for 20 hours. The conversion of the resin solution obtained, which was determined as a ratio of a non-volatile material after taking 2 g of the resin solution and 0.01 g of benzoquinone in a tin dish and drying at 80° C. for 3 hours under a reduced pressure, was 97%. Then, thereto were added 102 parts of methoxypropanol, 241 parts of glycidyl methacrylate, one part of tetraethylammonium bromide and one part of 2,6-di-tert-butyl-4-methylphenol followed by reacting at 115° C. As the acid value of the resin became nearly constant value of 54 after reacting for 8 hours, the reaction mixture was cooled to obtain resin solution (a) having a solid content of 70%. The polymer formed was found, as measured by GPC (gel permeation chromatography), to be a monodisperse resin having a number-average molecular weight (Mn) of 9,700 and a molecular weight distribution (Mw/Mn) of 1.43.

| Example 10 | |
|---|---|
| TEMPO | 15.6 parts |
| t-Butyl peroxy-2-ethylhexanoate | 13.0 parts |
| Styrene | 416 parts |

A mixture consisting of the above components was stirred at 95° C. for 4 hours while blowing nitrogen gas thereinto. Thereto were added 134 parts of itaconic anhydride and 71 parts of acryloyl morpholine, followed by stirring at 125° C. for 20 hours. The conversion of the resin solution obtained, which was determined as a ratio of a non-volatile material after taking 2 g of the resin solution and 0.01 g of benzoquinone in a tin dish and drying at 80° C. for 3 hours under a reduced pressure, was 80%. The polymer formed was found, as measured by GPC (gel permeation chromatography), to be a monodispcrse resin having a number-average molecular weight (Mn) of 5,100 and a molecular weight distribution (Mw/Mn) of 1.35. The resin solution was poured into about twenty times the quantity of heptane to precipitate the resin produced, followed by filtrating and drying under a reduced pressure, to obtain a solid resin. 325 parts of the above solid resin was dissolved in 169 parts of diethyleneglycol dimethyl ether and the resulting resin solution was kept at a temperature of 80° C. Then, thereto were added 70 parts of 2-hydroxyethyl acrylate and one part of 2,6-di-tert-butyl-4-methylphenol followed by reacting at 80° C. As the acid value of the resin became nearly constant value of 91 after reacting for 4 hours, the reaction mixture was cooled to obtain resin solution (b) having a solid content of 70%. The polymer formed was found, as measured by GPC (gel permeation chromatography), to be a monodisperse resin having a number-average molecular weight (Mn) of 6,200 and a molecular weight distribution (Mw/Mn) of 1.37.

| Example 11 | |
|---|---|
| TEMPO | 15.6 parts |
| t-Butyl peroxy-2-ethylhexanoate | 13.0 parts |
| Styrene | 416 parts |

A mixture consisting of the above components was stirring at 95° C. for 4 hours while blowing nitrogen gas thereinto. Thereto was added 355 parts of glycidyl methacrylate, followed by stirring at 125° C. for 12 hours. The conversion of the resin solution obtained, which was determined as a ratio of a non-volatile material after taking 2 g of the resin solution and 0.01 g of benzoquinone in a tin dish and drying at 80° C. for 3 hours under a reduced pressure, was 75%. The polymer formed was found, as measured by GPC (gel permeation chromatography), to be a monodisperse resin having a number-average molecular weight (Mn) of 6,000 and a molecular weight distribution (Mw/Mn) of 1.35. The resin solution was poured into about twenty times the quantity of methanol to precipitate the resin produced, followed by filtrating and drying under a reduced pressure, to obtain a solid resin. 400 Parts of the above solid resin was dissolved in 227 parts of butyl cellosolve and the resulting resin solution was kept at a temperature of 70° C. Then, thereto were added 45 parts of dimethylaminoethanol, 86 parts of acrylic acid and one part of 2, 6-di-tert-butyl-4-methylphenol, followed by reacting at 70° C. As the acid value of the resin became a nearly constant value of 10 after reacting for 4 hours, the reaction mixture was cooled to obtain resin solution (c) having a solid content of 70%. The polymer formed was found, as measured by GPC (gel permeation chromatography), to be a monodisperse resin having a number-average molecular weight (Mn) of 7,600 and a molecular weight distribution (Mw/Mn) of 1.43. The resin solution (c) could be mixed with water freely in any proportion.

| Example 12 | |
|---|---|
| TEMPO | 15.6 parts |
| t-Butyl peroxy-2-ethylhexanoate | 13.0 parts |
| Styrene | 416 parts |

A mixture consisting of the above components was stirred at 95° C. for 4 hours while blowing nitrogen gas thereinto. Thereto were added 143 parts of dimethylaminoethyl acrylate and 174 parts of 2-hydroxyethyl arylate, followed by stirring at 125° C. for 20 hours. The conversion of the resin solution obtained, which was determined as a ratio of a non-volatile material after taking 2 g of the resin solution and 0.01 g of benzoquinone in a tin dish and drying at 80° C. for 3 hours under a reduced pressure, was 70%. The polymer formed was found, as measured by GPC (gel permeation chromatography), to be a monodisperse resin having a number-average molecular weight (Mn) of 5,300 and a molecular weight distribution (Mw/Mn) of 1.33. The resin solution was poured into about twenty times the quantity of hexane to precipitate the resin produced, followed by filtrating and drying under a reduced pressure, to obtain a solid resin. 381 Parts of the above solid resin was dissolved in 235 parts of diethyleneglycol dimethyl ether and the resulting resin solution was kept at a temperature of 80° C. Then, thereto were added 169 parts of an equimolar adduct of isophorone diisocyanate and 2-hydroxyethyl acrylate, one part of 2,6-di-tert-butyl-4-methylphenol and a small amount of dibutyltin dilaurate, followed by reacting at 80° C. As the isocyanate value of the resin became zero after reacting for 4 hours, the reaction mixture was cooled to obtain resin solution (d) having a solid content of 70%. The polymer formed was found, as measured by GPC (gel permeation chromatography), to be a monodisperse resin having a number-average molecular weight (Mn) of 8,700 and a molecular weight distribution (Mw/Mn) of 1.42.

| Example 13 | |
|---|---|
| TEMPO | 15.6 parts |
| t-Butyl peroxy-2-ethylhexanoate | 13.0 parts |
| Styrene | 520 parts |

A mixture consisting of the above components was stirred at 95° C. for 4 hours while blowing nitrogen gas thereinto. Thereto were added 174 parts of 2-hydroxyethyl acrylate and 58 parts of acrylic acid, followed by stirring at 125° C. for 5 hours. Then, thereto was added 334 parts of m-xylene, followed by stirring at 125° C. for 20 hours. The conversion of the resin solution obtained, which was determined as a ratio of a non-volatile material after taking 2 g of the resin solution and 0.01 g of benzoquinone in a tin dish and drying at 80° C. for 3 hours under a reduced pressure, was 97%. The polymer formed was found, as measured by GPC (gel permeation chromatography), to be a monodisperse resin having a number-average molecular weight (Mn) of 7,800 and a molecular weight distribution (Mw/Mn) of 1.31. Thereto were added 106 parts of 1,2-naphtoquinone-diazide-5-[N-methyl-N-(2-hydroxyethyl)]-sulfonate, 45 parts of m-xylene and a small amount of dibutyltin dilaurate, followed by reacting at 80° C. As the isocyanate value of the resin became zero after reacting for 5 hours, the reaction mixture was cooled to obtain resin solution (e) having a solid content of 70%. The polymer formed was found, as measured by GPC (gel permeation chromatography), to be a monodisperse resin having a number-average molecular weight (Mn) of 8,600 and a molecular weight distribution (Mw/Mn) of 1.39.

| Comparative Example 10 | |
|---|---|
| t-Butyl peroxy-2-ethylhexanoate | 33 parts |
| Styrene | 416 parts |
| 2-Hydroxyethyl acrylate | 58 parts |
| Acrylic acid | 180 parts |

A flask was charged with 349 parts of butyl cellosolve followed by replacing the inner space with nitrogen gas and then heating to a temperature of 110° C. with agitation. Then, a mixture consisting of the above components was added dropwise over 4 hours while blowing nitrogen gas thereinto, followed by stirring at 110° C. for 2 hours and cooling. The conversion of the resin solution obtained, which was determined as a ratio of a non-volatile material after taking 2 g of the resin solution and 0.01 g of benzoquinone in a tin dish and drying at 80° C. for 3 hours under a reduced pressure, was 99%. Thereto were added 241 parts of glycidyl methacrylate, one part of tetraethylammonium bromide and one part of 2,6-di-tert-butyl-4-methylphenol, followed by reacting at 115° C. As the acid value of the resin became nearly constant value of 50 after reacting for 8 hours, the reaction mixture was cooled to obtain resin solution (f) having a solid content of 70%. The polymer formed was found, as measured by GPC (gel permeation chromatography), to be a resin having a number-average molecular weight (Mn) of 10,200 and a molecular weight distribution (Mw/Mn) of 2.35.

| Comparative Example 11 | |
| --- | --- |
| t-Butyl peroxy-2-ethylhexanoate | 36 parts |
| Styrene | 416 parts |
| Itaconic anhydride | 134 parts |
| Acryloyl morpholine | 71 parts |

A flask was charged with 378 parts of diethylene glycol dimethyl ether followed by replacing the inner space with nitrogen gas and then heating to a temperature of 110° C. with agitation. Then, a mixture consisting of the above components was added dropwise over 4 hours while blowing nitrogen gas thereinto, followed by stirring at 110° C. for 2 hours and cooling. The conversion of the resin solution obtained, which was determined as a ratio of a non-volatile material after taking 2 g of the resin solution and 0.01 g of benzoquinone in a tin dish and drying at 80° C. for 3 hours under a reduced pressure, was 99%. Thereto were added 139 parts of 2-hydroxyethyl arylate and one part of 2,6-di-tert-butyl-4-methylphenol, followed by reacting at 80° C. As the acid value of the resin became a nearly constant value of 90 after reacting for 4 hours, the reaction mixture was cooled to obtain resin solution (g) having a solid content of 65%. The polymer formed was found, as measured by GPC (gel permeation chromatography), to be a resin having a number-average molecular weight (Mn) of 7,000 and a molecular weight distribution (Mw/Mn) of 2.57.

| Comparative Example 12 | |
| --- | --- |
| t-Butyl peroxy-2-ethylhexanoate | 46 parts |
| Styrene | 416 parts |
| Glycidyl methacrylate | 355 parts |

A flask was charged with 468 parts of butyl cellosolve followed by replacing the inner space with nitrogen gas and then heating to a temperature of 110° C. with agitation. Then, a mixture consisting of the above components was added dropwise over 4 hours while blowing nitrogen gas thereinto, followed by stirring at 110° C. for 2 hours and cooling. The conversion of the resin solution obtained, which was determined as a ratio of a non-volatile material after taking 2 g of the resin solution and 0.01 g of benzoquinone in a tin dish and drying at 80° C. for 3 hours under a reduced pressure, was 99%. Thereto was added one part of 2,6-di-tert-butyl-4-methylphenol, followed by adding a monomer mixture consisting of 84 parts of dimethylaminoethanol and 180 parts of acrylic acid over one hour at a temperature of 70° C. As the acid value of the resin became a nearly constant value of 10 after reacting for 8 hours, the reaction mixture was cooled to obtain resin solution (h) having a solid content of 67%. The polymer formed was found, as measured by GPC (gel permeation chromatography), to be a resin having a number-average molecular weight (Mn) of 7,300 and a molecular weight distribution (Mw/Mn) of 2.24. The resin solution (h) could be mixed with water freely in any proportion.

| Comparative Example 13 | |
| --- | --- |
| t-Butyl peroxy-2-ethylhexanoate | 44 parts |
| Styrene | 416 parts |
| 2-Hydroxyethyl acrylate | 174 parts |
| Dimethylaminoethyl acrylate | 143 parts |

A flask was charged with 445 parts of diethylene glycol dimethyl ether followed by replacing the inner space with nitrogen gas and then heating to a temperature of 110° C. with agitation. Then, a mixture consisting of the above components was added dropwise over 4 hours while blowing nitrogen gas thereinto, followed by stirring at 110° C. for 2 hours and cooling. The conversion of the resin solution obtained, which was determined as a ratio of a non-volatile material after taking 2 g of the resin solution and 0.01 g of benzoquinone in a tin dish and drying at 80° C. for 3 hours under a reduced pressure, was 98%. The resulting resin solution was kept at a temperature of 80° C. Then, thereto were added 338 parts of an equimolar adduct of isophorone diisocyanate and 2-hydroxyethyl acrylate, one part of 2,6-di-tert-butyl-4-methylphenol and a small amount of dibutyltin dilaurate, followed by reacting at 80° C. As the isocyanate value of the resin became zero after reacting for 5 hours, the reaction mixture was cooled to obtain resin solution (i) having a solid content of 69%. The polymer formed was found, as measured by GPC (gel permeation chromatography), to be a resin having a number-average molecular weight (Mn) of 9,500 and a molecular weight distribution (Mw/Mn) of 2.33.

| Comparative Example 14 | |
| --- | --- |
| t-Butyl peroxy-2-ethylhexanoate | 45 parts |
| Styrene | 520 parts |
| 2-Hydroxyethyl acrylate | 174 parts |
| Acrylic acid | 58 parts |

A flask was charged with 456 parts of m-xylene followed by replacing the inner space with nitrogen gas and then heating to a temperature of 110° C. with agitation. Then, a mixture consisting of the above components was added dropwise over 4 hours while blowing nitrogen gas thereinto, followed by stirring at 110° C. for 2 hours and cooling. The conversion of the resin solution obtained, which was determined as a ratio of a non-volatile material after taking 2 g of the resin solution and 0.01 g of benzoquinone in a tin dish and drying at 80° C. for 3 hours under a reduced pressure, was 99%. The resulting resin solution was kept at a temperature of 80° C. Then, thereto were added 106 parts of 1,2-naphtoquinone-diazide-5-[N-methyl-N(2-hydroxyethyl)]-sulfonate and a small amount of dibutyltin dilaurate, followed by reacting at 80° C. As the isocyanate value of the resin became zero after reacting for 5 hours, the reaction mixture was cooled to obtain resin solution (j) having a solid content of 63%. The polymer formed was found, as measured by GPC (gel permeation chromatography), to be a resin having a number-average molecular weight (Mn) of 9,100 and a molecular weight distribution (Mw/Mn) of 2.15.

Application Examples 10 to 14 and Comparative Application Examples 10 to 14 (Application to Photoresist Coatings)

The resin solutions (a) to (j) obtained by Examples 9 to 13 and Comparative Examples 10 to 14 and other components were mixed in accordance with the compounding recipes shown in Table 3 to obtain photosensitive coating compositions.

The symbols in Table 3 have the following meaning:
(*1) IRGACURE 907: photopolymerization initiator, a product of CIBA GEIGY CO., LTD.
(*2) MODAFLOW: surface conditioning agent, a product of MONSANTO CO., LTD. having a tradename of "MODAFLOW".
(*3) Developer 1: a 1.0% aqueous sodium carbonate solution
Developer 2: deionized water
Developer 3: a 10% aqueous lactic acid solution
Developer 4: a 0.1% aqueous sodium carbonate solution Each photosensitive coating composition was applied to a substrate comprising copper glass fiber reinforced epoxy resin laminate by spray coating to a dry film thickness of about 20 micrometers, followed by drying the substrate for 15 minutes at a temperature of 80° C.

A negative film pattern mask (Application Examples 10 to 13 and Comparative Application Examples 10 to 13) or a positive film pattern mask (Application Example 14 and Comparative Application Example 14) was then adhered to the dried coated film under reduced pressure, and the substrate and pattern mask were irradiated with ultraviolet light by means of a 3KW ultrahigh mercury lamp.

The resulting samples were tested according to the following test procedures. The results are shown in Table 3.

Developing was conducted by spraying each developer shown in Table 3 on the substrate and pattern mask for 2 minutes at a temperature of 25° C., followed by etching by using ferric chloride solution to obtain a printed circuit board. The pattern of the printed circuit board obtained was evaluated according to the following test procedures. The result is also shown in Table 3.

TEST PROCEDURES

Peeling Property

After closely adhering a negative or positive film pattern mask to a dried coated film and irradiating it by means of a 3KW ultrahigh pressure mercury lamp, the negative or positive film pattern mask was peeled off and the surface of the coated film was evaluated according to the following criteria:
a: All the pattern mask could be peeled off.
b: There remained a part of the pattern mask on the surface of the coated film.

Sensitivity

A smallest exposure (mJ/cm$^2$) required for obtaining a reproducible cured film of a test pattern having a line pattern of 100 (line)/100 (space) micrometers after development.

Pre-baking Time

A largest pre-baking time (minutes) required for obtaining a cured film where there exists no residue on the non-exposed part of the film after development.

Pattern

The pattern of the printed circuit board having a line pattern of 50 (line)/50 (space) micrometers was evaluated after etching according to the following criteria:
a: There existed no pattern defect.
b: The formed pattern had partial defect.

TABLE 1

|  |  | Application Example | | | | | Comparative Application Example | | | |
| --- | --- | --- | --- | --- | --- | --- | --- | --- | --- | --- |
|  |  | 1 | 2 | 3 | 4 | 5 | 1 | 2 | 3 | 4 |
| Formulation |  |  |  |  |  |  |  |  |  |  |
| Backbone | Kind | (A) | (A) | (B) | (C) | (D) | (E) | (F) | (G) | (H) |
| Resin | Amount (Parts) | 100 | 100 | 100 | 100 | 100 | 100 | 100 | 100 | 100 |
| Curing Agent | ESCN-195 | 30 |  |  |  |  | 30 |  |  |  |
| (Parts) | Resin Slution (B) |  | 80 |  |  |  |  |  |  |  |
|  | Dodecanoic acid |  |  | 20 |  |  |  | 20 |  |  |
|  | MS-11 |  |  |  | 20 | 20 |  |  | 20 | 20 |
| Pigment | Cu-Phthalocyanine Blue | 10 | 10 |  |  |  | 10 |  |  |  |
| (Parts) | Carbon Black |  |  | 10 | 10 | 10 |  |  | 10 | 10 |
| Catalyst | TEABr | 1 | 1 | 1 |  |  | 1 | 1 |  |  |
| (Parts) | PTS |  |  |  | 1 | 1 |  |  | 1 | 1 |
| Evaluation |  |  |  |  |  |  |  |  |  |  |
| Storage stability |  | A | A | A | A | A | B | B | B | B |
| Film | 20 Degree loss | 95 | 97 | 95 | 95 | 98 | 82 | 79 | 77 | 97 |
| Property | Solvent resistance | 95 | 97 | 95 | 95 | 98 | 76 | 65 | 61 | Dissolve |
|  | Acid resistance | A | A | A | A | A | B | B | B | C |

TABLE 2

| | | Application Example | | | | Comparative Application Example | | | | |
|---|---|---|---|---|---|---|---|---|---|---|
| | | 6 | 7 | 8 | 9 | 5 | 6 | 7 | 8 | 9 |
| Formulation | | | | | | | | | | |
| Backbone Resin | Kind | (I) | (J) | (K) | (L) | (M) | (N) | (O) | (P) | (Q) |
| | Amount(Parts) | 80 | 80 | 75 | 83 | 80 | 80 | 80 | 75 | 83 |
| Curing Agent (Parts) | Dodecanoic acid | 20 | 20 | | | 20 | 20 | 20 | | |
| | B1530 | | | 25 | | | | | 25 | |
| | TGIC | | | | 17 | | | | | 17 |
| POLYFLOW-S (Parts) | | 1.0 | 1.0 | 1.0 | 1.0 | 1.0 | 1.0 | 1.0 | 1.0 | 1.0 |
| Benzoin (Parts) | | 0.5 | 0.5 | 0.5 | 0.5 | 0.5 | 0.5 | 0.5 | 0.5 | 0.5 |
| Evaluation | | | | | | | | | | |
| Caking of composition | | A | A | A | A | B | C | B | B | B |
| Film Property | Finish appearance | A | A | A | A | C | B | C | C | C |
| | 60 degree gloss | 91 | 93 | 91 | 92 | 73 | 85 | 80 | 82 | 78 |

TABLE 3

| | | Application Example | | | | | Comparative Application Example | | | | |
|---|---|---|---|---|---|---|---|---|---|---|---|
| | | 10 | 11 | 12 | 13 | 14 | 10 | 11 | 12 | 13 | 14 |
| Formulation | | | | | | | | | | | |
| Backbone Resin | Kind | (a) | (b) | (c) | (d) | (e) | (f) | (g) | (h) | (i) | (j) |
| | Amount (Parts) | 100 | 100 | 100 | 100 | 100 | 100 | 100 | 100 | 100 | 100 |
| Initiator | Kind | IRGACURE 907 (*1) | | | | — | IRGACURE 907 (*1) | | | | — |
| | Amount (Parts) | 5 | 5 | 5 | 5 | — | 5 | 5 | 5 | 5 | — |
| Surface conditioning agent | | MODAFLOW (*2) | | | | | MODAFLOW (*2) | | | | |
| | Amount (Parts) | 1 | 1 | 1 | 1 | 1 | 1 | 1 | 1 | 1 | 1 |
| Evaluation | | | | | | | | | | | |
| Peeling Property | | a | a | a | a | a | b | b | b | b | b |
| Sensitivity | | 50 | 50 | 50 | 50 | 50 | 80 | 90 | 80 | 80 | 70 |
| Kind of Developer (*3) | | 1 | 1 | 2 | 3 | 4 | 1 | 1 | 2 | 3 | 4 |
| Pre-baking Time | | 60 | 60 | 60 | 60 | 50 | 40 | 30 | 40 | 40 | 30 |
| Pattern | | a | a | a | a | a | b | a | b | a | a |

What is claimed is:

1. A process for producing a crosslinkable styrene based polymer having at least one self-crosslinkable or crosslinkable functional group selected from the group consisting of hydroxyl, carboxyl glycidyl, alkoxysilyl and N-methylol, and having a narrow molecular weight distribution by radical polymerization of a mixture of at least one of styrene and styrene derivative monomer and at least one comonomer, wherein the polymerization is conducted in the presence of a catalyst system composed of a free radical compound and a radical polymerization initiator, and the comonomer contains a monomer having said self-crosslinkable or crosslinkable functional group.

2. A process of claim 1 wherein the polymerization is conducted in the presence of an effective amount of at least one compound selected from the group consisting of phosphorus compounds, aluminum compounds and boron compounds.

3. A process of any one of claims 1 and 2 wherein the polymerization is stopped during polymerization and substantially all unreacted monomer is removed from the reaction mixture.

4. A crosslinkable styrene based polymer of the process of claim 1, wherein the crosslinkable styrene based polymer contains at least one self-crosslinkable functional group selected from the group consisting of alkoxysilyl, glycidyl and N-methylol, and is capable of being converted into a three-dimensional crosslinked resin by heating in the presence of a catalyst.

* * * * *